United States Patent
Kohno

(10) Patent No.: US 8,822,055 B2
(45) Date of Patent: Sep. 2, 2014

(54) SECONDARY BATTERY

(75) Inventor: Ryuji Kohno, Mito (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 0 days.

(21) Appl. No.: 13/805,975

(22) PCT Filed: Feb. 23, 2011

(86) PCT No.: PCT/JP2011/053977
§ 371 (c)(1),
(2), (4) Date: Dec. 20, 2012

(87) PCT Pub. No.: WO2011/161984
PCT Pub. Date: Dec. 29, 2011

(65) Prior Publication Data
US 2013/0101877 A1 Apr. 25, 2013

(30) Foreign Application Priority Data

Jun. 21, 2010 (JP) ................... 2010-140786

(51) Int. Cl.
*H01M 4/00* (2006.01)
(52) U.S. Cl.
USPC .......................................................... 429/94
(58) Field of Classification Search
USPC .......................................... 429/94, 161, 164
See application file for complete search history.

(56) References Cited

U.S. PATENT DOCUMENTS

| 7,807,292 | B2 * | 10/2010 | Takagi et al. .................. 429/161 |
| 2010/0035144 | A1 * | 2/2010 | Oh et al. .......................... 429/164 |
| 2010/0310924 | A1 * | 12/2010 | Kaneda et al. ................. 429/163 |
| 2011/0104561 | A1 * | 5/2011 | Kim et al. ....................... 429/181 |

FOREIGN PATENT DOCUMENTS

| JP | 2000-150306 A | 5/2000 |
| JP | 2007-226989 A | 9/2007 |
| JP | 2009-170137 A | 7/2009 |
| JP | 2009-289593 A | 12/2009 |

* cited by examiner

*Primary Examiner* — Stewart Fraser
(74) *Attorney, Agent, or Firm* — Volpe and Koenig, P.C.

(57) ABSTRACT

A secondary battery adapted to minimize deterioration attributable to temperature is provided. In the secondary battery, a cross-sectionally elliptic electricity-generating element group in which a positive electrode sheet including at one side in a longitudinal direction thereof a section not coated with an active material mixture, and a negative electrode sheet including at one side in a longitudinal direction thereof a section not coated with an active material mixture are wound via separators is accommodated in a battery container. When a planar region of the electricity-generating element group is seen in plan view, the number of connections between the non-coated section of the positive or negative electrode sheet and a connecting surface of a positive or negative electrode connecting sheet is two for each of positive and negative electrodes, and a distance between the two connections is greater than ¼ of innermost circumferential length of the electricity-generating element group, but is smaller than ¼ of outermost circumferential length of the electricity-generating element group.

5 Claims, 6 Drawing Sheets

SECONDARY BATTERY

TECHNICAL FIELD

The present invention relates generally to secondary batteries, and more particularly, to a secondary battery including an electricity-generating element group of a cross-sectionally elliptic shape with a positive electrode sheet and a negative electrode sheet, both wound in spiral form via a separator.

BACKGROUND ART

Secondary batteries are widely known as secondary batteries for vehicle driving. Such a secondary battery includes following components: a positive electrode sheet and a negative electrode sheet, both forming part of an electricity-generating element group, a separator that separates the positive electrode sheet and the negative electrode sheet from each other, and an electrolyte. These components are housed together in an enclosed battery container made of a metal or resin. The secondary battery also includes external terminals fixed to the battery container and electrically continuous with the electrodes that form part of the electricity-generating element group. Lithium-ion secondary batteries are typical secondary batteries of this kind.

A large number of conventional lithium-ion secondary batteries have had a cylindrical shape in appearance. On the other hand, developing unit-cell batteries of a rectangular shape has recently come to be studied. These unit-cell batteries are intended to improve packaging density (volumetric capacity density) by combining tens of, or more than a hundred, unit cells and constructing a battery pack or battery module for vehicle-mounting specifications in response to the need for higher power output and capacity.

For example, JP-2000-150306-A discloses a battery or capacitor. In such a disclosure, a case cover is applied over an opening in a rectangularly shaped and aluminum-made case body accommodating an electrode structure (hereinafter, referred to as the electricity-generating element group), and then the connection is caulked or staked via a gasket, to hermetically seal the case. The case cover, made from a phenol-based resin, is formed with a terminal-mounting hole for fixing a current-collector terminal member at both ends of the cover, and an electrolyte-filling hole for filling the battery with an electrolyte at a central portion of the cover. The electricity-generating element group includes a current-collector foil laminate that is not coated with an active material mixture at an end portion of the laminate and has only current-collector foil sections formed into lamination (this foil laminate is hereinafter referred to as the non-coated section), and the element group is electrically continuous with a region inclusive of external terminals as well as clamping-type current-collector members for clamping the non-coated section. The non-coated section is resistance-welded at three places on each current-collector foil in such a form as to bias the foil in the direction that it is clamped (refer to JP-2000-150306-A, FIG. 4, reference number 14).

In another example of a rectangular battery, as disclosed in JP-2007-226989-A, an electrode group (hereinafter, referred to as the electricity-generating element group) with exposed sections of cores formed at both ends (these exposed sections are hereinafter referred to as the non-coated sections) is housed in a metallic outer casing of a rectangularly parallelepipedic shape. The electricity-generating element group is formed by interposing, between a positive electrode sheet and a negative electrode sheet, a band-shaped separator formed from a microporous membrane, and after winding the electrode sheets and the separator into spiral form, taping this spiral body at its outermost region for flattening. A positive-electrode non-coated section is formed at one end of the electricity-generating element group, and a negative-electrode non-coated section at the other end. The positive-electrode non-coated section and the negative-electrode non-coated section are welded in a bundled condition onto a positive current collector and a negative current collector, respectively (these current collectors are hereinafter referred to as the connecting sheets). In other words, the non-coated sections and the connecting sheets are laser-welded over a predetermined length by laser beam irradiation with the main body of one connecting sheet pressed against each non-coated section.

SUMMARY OF THE INVENTION

Problems to be Solved by the Invention

In the lithium-ion secondary battery being charged or discharged, an electric charge, while passing through the welded connections between the exposed sections (hereinafter, referred to as the non-coated sections) of the positive and negative electrode foils and the connecting sheets, moves through each of the positive electrode sheet and the negative electrode sheet, in the direction of the respective principal planes. The distribution of the charges in the positive and the negative electrode sheet is not always uniform and have tendency to concentrate on the welded connections of the non-coated sections to the connecting sheets. The reason is as follows. In the band-shaped electricity-generating element group, for example when the charge moves from the negative electrode to the positive electrode, the movement of the charge in the neighborhood of a cross-direction central region is substantially parallel to a cross direction of the electricity-generating element group, whereas, as the charge moves closer to the welded connections on the positive electrode, the direction of the movement changes towards the closest connection.

At these welded connections, current density increases above that of any other sections, which causes an increased amount of heat and results in local temperature rises. Since the deterioration of the lithium-ion secondary battery in characteristics tends to progress with increases in temperature, the deterioration of the active material in the neighborhood of the connections selectively rapidly proceeds.

On the other hand, if welded connections exist in countless numbers in the entire longitudinal region of the non-coated section or exist over the entire region of the non-coated section, the current density will be made uniform and the amount of heat occurring will be minimized. Such is however an unrealistic measure in terms of manufacture. Accordingly, the above-discussed techniques in which the number of welded connections is set to be finite are suitable in terms of manufacture.

In JP-2000-150306-A, however, the non-coated section is connected by welding at three places on each current-collector foil without their relative positions being defined. This welding method does not enable response to the above-discussed problems, since the current density in the neighborhood of the welded connections does not become uniform. In addition, since, in JP-2007-226989-A, the non-coated sections and the connecting sheets are connected by laser welding over a certain length, the time required for welding could be long and associated heat energy is liable to act upon the electricity-generating element group. As a result, the separator may be damaged that is particularly weak against high temperatures among the constituent parts of the electricity-generating element group.

With the above issues in mind, the present invention is intended to provide a secondary battery that can minimize deterioration attributable to temperature.

Means for Solving the Problems

In order to solve the above issues, a secondary battery according to an aspect of the present invention includes: a cross-sectionally elliptic electricity-generating element group in which a positive electrode sheet including at one side in a longitudinal direction thereof a section not coated with an active material mixture, and a negative electrode sheet including at one side in a longitudinal direction thereof a section not coated with an active material mixture are wound via separators in such a form that the non-coated sections of the positive and negative electrode sheets are arranged on sides opposite to each other; a battery container in which to accommodate the electricity-generating element; a positive electrode connecting sheet and a negative electrode connecting sheet, both connected at one side of each thereof to those non-coated sections of the positive and negative electrode sheets, respectively, that are positioned at end portions of a planar region present between curves formed by winding the positive and negative electrode sheets of the electricity-generating element group; and a positive electrode external terminal and a negative electrode external terminal, both fixed to the battery container and each connected to the other side of each of the positive and negative electrode connecting sheets; wherein, when the planar region of the electricity-generating element group is seen in plan view, the number of connections between the non-coated section of the positive or negative electrode sheet and one side of the positive or negative electrode connecting sheet is two for each of positive and negative electrodes, and a distance between the two connections is greater than ¼ of innermost circumferential length of the wound positive and negative electrode sheets of the electricity-generating element group, but is smaller than ¼ of outermost circumferential length of the wound positive and negative electrode sheets of the electricity-generating element group.

In the present invention, current-collector foils that constitute the non-coated sections of the positive and negative electrode sheets are preferably bundled together at the end portions of the planar region of the electricity-generating element group so as to come into contact. Additionally, the distance between the two connections may be made the same as between the non-coated sections of the positive and negative electrode sheets. Furthermore, the non-coated sections of the positive and negative electrode sheets and one side of each of the positive and negative electrode connecting sheets are desirably interconnected by ultrasonic welding. Moreover, the positive electrode connecting sheet and the positive electrode external terminal may be constructed as a single member, and the negative electrode connecting sheet and the negative electrode external terminal may also be constructed as a single member.

Effects of the Invention

In accordance with the present invention, the number of connections between the non-coated section of the positive or negative electrode sheet and one side of the positive or negative electrode connecting sheet when the planar region of the electricity-generating element group is seen in plan view is set to be two for each of the positive and negative electrodes. In addition, the distance between the two connections is set to be greater than ¼ of the innermost circumferential length of the wound positive and negative electrode sheets of the electricity-generating element group, but is smaller than ¼ of the outermost circumferential length of the wound positive and negative electrode sheets of the electricity-generating element group. These creative measures yield advantageous effects in that an equal flow of a current in an entire region of the current-collector foils creates uniform current density, prevents local heat from occurring in the electricity-generating element group, avoids local temperature rises associated with the occurrence of this local heat, and suppresses partial deterioration of the electricity-generating element group attributable to temperature.

MODE FOR CARRYING OUT THE INVENTION

Hereunder, an embodiment that applies the present invention to a lithium-ion secondary battery for a hybrid electric automobile will be described referring to the accompanying drawings.

Configuration (Overall Structure)

Figure 1:
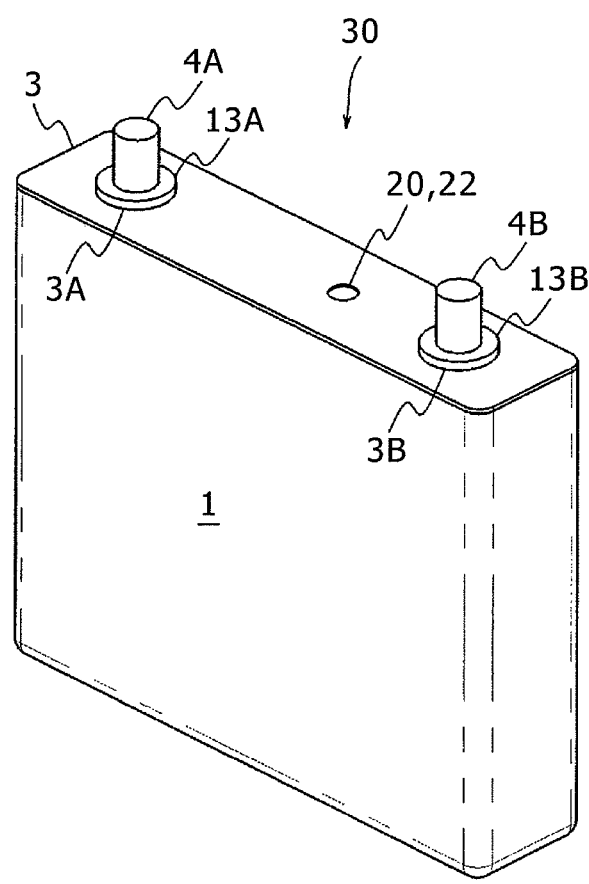
FIG. 1 is a perspective view showing a lithium-ion secondary battery of an embodiment to which the present invention can be applied.

As shown in FIG. 1, the lithium-ion secondary battery 30 (hereinafter, referred to simply as the secondary battery 30) of the present embodiment includes a battery container, which is constituted by a battery cover 3 of a flat sheet shape and a rectangular closed-end battery casing 1 rounded at corners and formed by deep drawing to have an opening whose depth is greater than a dimension of short sides of the opening. The battery cover 3 is pierced at either end thereof with a circular through-hole 3A or 3B, in the holes of which, external terminals 4A and 4B of positive and negative electrodes are inserted via sealing materials 13A and 13B. The battery cover 3 is also formed with a filling port 20 for filling the battery with an electrolyte, the filling port 20 being sealed with a filler plug 22. The battery casing 1 and the battery cover 3 are both fabricated from an aluminum alloy.

Figure 2:
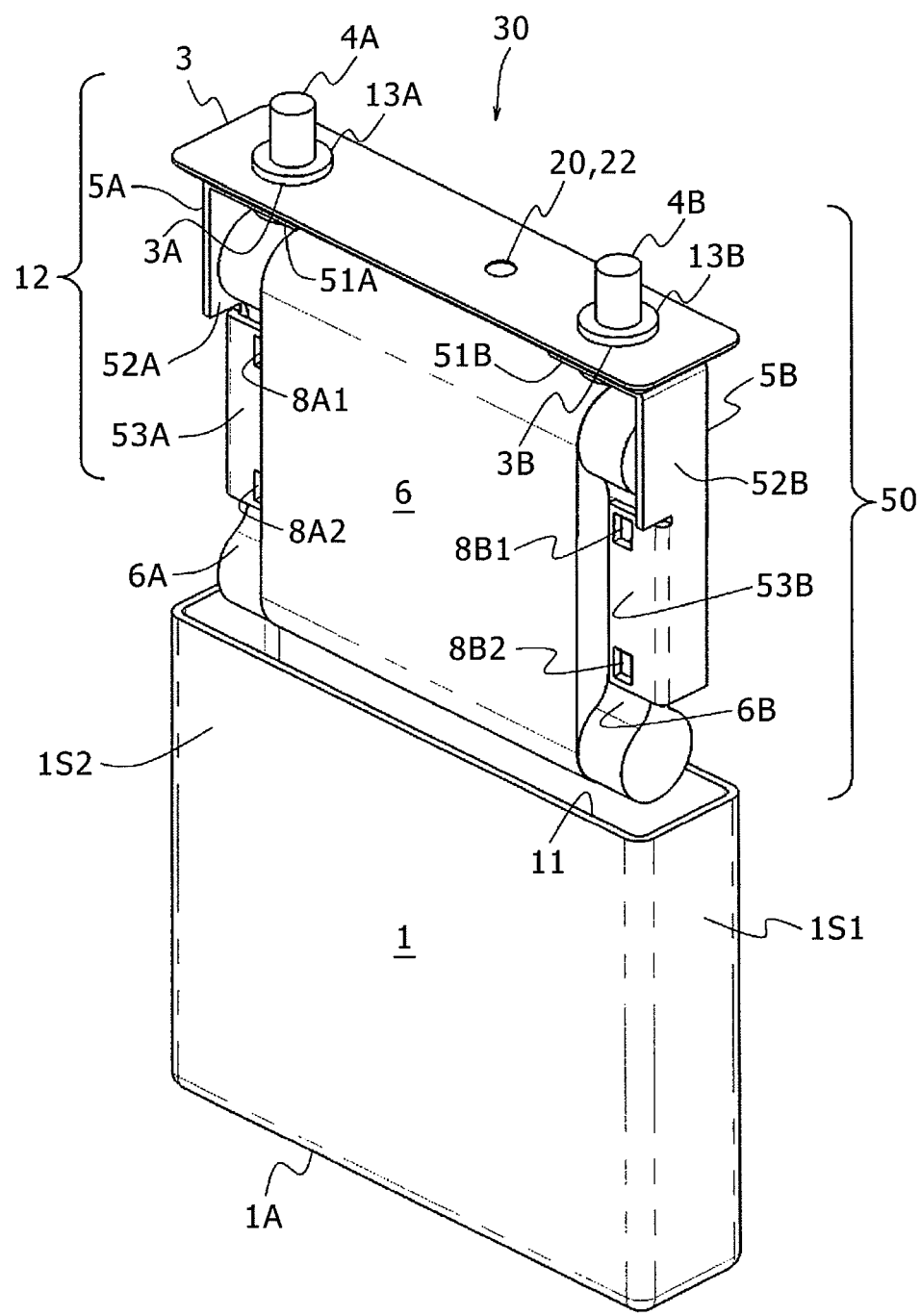
FIG. 2 is a perspective view showing an internal configuration of the lithium-ion secondary battery of the embodiment.

As shown in FIG. 2, an opening 11 is formed on a side opposite to the closed end 1A (lower surface) of the battery casing 1. Inside a rectangularly parallelepipedic space defined by the battery casing 1 and the battery cover 3, an electricity-generating element assembly 50, structure integrated by connecting the electricity-generating element group 6 and a battery cover assembly 12 at connections 8A1, 8A2, 8B1, 8B2, is inserted from the opening 11 and accommodated. The battery casing 1 and the battery cover 3 are constructed to match each other at respective outer edges, the outer edges being sealed without clearances by welding.

(Electricity-Generating Element Group)

Figure 3:
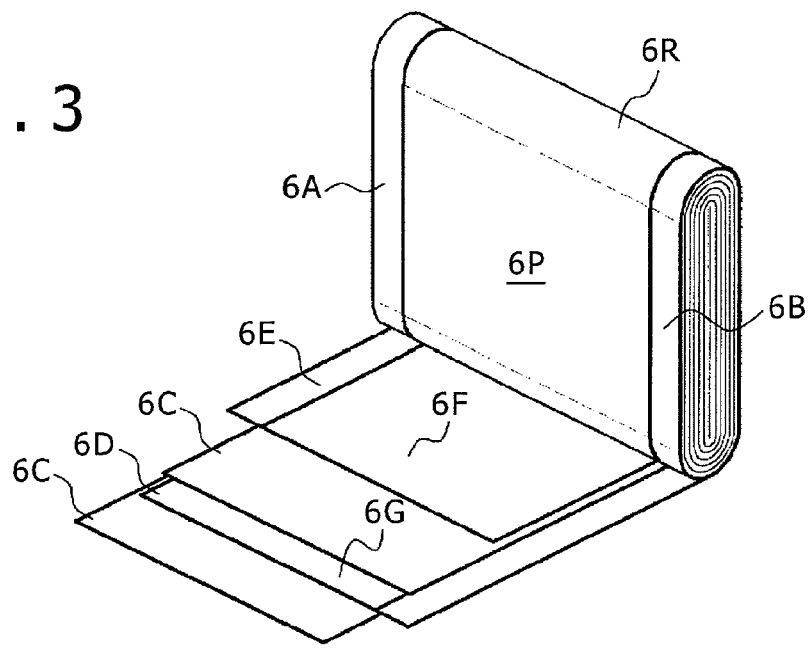
FIG. 3 is a perspective view showing a partly unwound electricity-generating element group.

As shown in FIG. 3, the electricity-generating element group 6 is a structure created by winding the positive and negative electrode sheets 6E, 6D into a shape of an oblate ellipsoid with separators 6C each interposed under one of the electrode sheets when viewed in the illustrated positional relationship. The positive and negative electrode sheets 6E and 6D include coated sections 6F and 6G, respectively, that are sections coated with an active material mixture on current-collector foils of the positive and negative electrode sheets. Non-coated sections 6A and 6B that are sections not coated with active material mixture are formed on one side in a longitudinal direction of the positive and negative electrode sheets 6E and 6D, respectively.

In order to ensure that the non-coated sections 6A, 6B lie on sides opposite to each other across a width of the electricity-generating element group 6, the non-coated sections 6A, 6B are positioned at both ends of the electricity-generating element group 6 that are present in an orthogonal direction with respect to a winding direction of the element group 6. The non-coated sections 6A, 6B, since they are not coated with active material mixture, are correspondingly thin relative to the coated sections 6F, 6G. In addition, in order to allow effortless insertion and accommodation of the electricity-generating element group 6 in the battery casing 1 in an assembly process (assembly procedure) described later herein, the electricity-generating element group 6 is formed into a flat spiral, shape (elliptic shape in cross section) to include curves 6R formed by winding the positive and negative electrode sheets, and a substantially flat plane region 6P positioned between the curves.

(Positive and Negative Electrode Connecting Sheets)

As shown in FIG. 2, the positive and negative electrode connecting sheets 5A, 5B each include: a horizontal mounting portion 51 (the other side of the connecting sheet) that has a round hole therein and extends along an inner lower surface of the battery cover 3; a lateral side portion 52A, 52B bent substantially at right angles from the mounting portion 51 and extending along a narrow side face 1S1 of the battery casing 1, towards the closed end (lower surface) 1A of the casing 1, down to a lower side portion of the electricity-generating element group 6; and a connection surface 53A, 53B (one side of the connecting sheet) bent substantially at right angles towards the electricity-generating element group 6, that is, along a wide side face 1S2 of the battery casing 1, at a lower half section of the lateral side portion 52A, 52B. The connection surfaces 53A, 53B, as detailed later herein, are each connected at two connecting portions, 8A1, 8A2, and 8B1, 8B2, to the non-coated sections of the electricity-generating element group 6. The positive electrode connecting sheet 5A is fabricated from an aluminum alloy, and the negative electrode connecting sheet 5B is fabricated from a copper alloy. The connecting portion 8A1 is positioned at the same height as that of the connecting portion 8B1, and the connecting portion 8A2 is positioned at the same height as that of the connecting portion 8B2.

(Cover Assembly)

Figure 4:
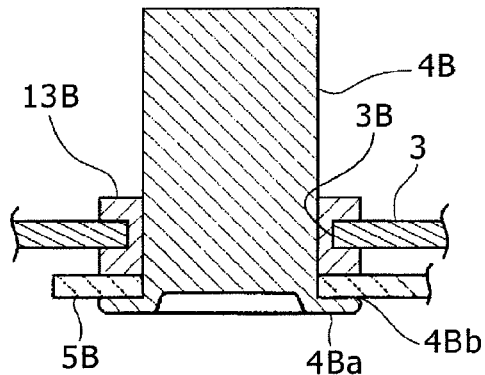
FIG. 4 is a cross-sectional view showing a hermetically sealed state of a negative electrode external terminal and neighborhood.

The cover assembly 12 is a structure formed by integrating the sealing materials 13, the external terminals 4A, 4B, and the connecting sheets 5A, 5B, mechanically with the battery cover 3. The external terminals 4A, 4B are passed through the through-holes 3A, 3B, respectively, and connected to the mounting portions 51, 51B, respectively, of the positive and negative electrode connecting sheets 5A, 5B. As shown in FIG. 4, at the negative electrode side, the sealing material 13 is fitted into the through-holes 3B of the battery cover 3, then the negative electrode external terminal 4B and the negative electrode connecting sheet 5B are arranged so as to sandwich the sealing material 13 from upper and lower sides, respectively, of the sealing material. A cylindrical lower end of the negative electrode external terminal 4B previously inserted into the round hole of the mounting portion 51 for the negative electrode connecting sheet 5B is bent outward while compressing the sealing material 13 so that a predetermined amount thereof is crushed. Thus constructing a caulked or staked portion 4Ba ensures secure connection of the external terminal, hence integrating each constituent part, and providing mechanical strength. In addition, the caulked/staked portion 4Ba is spot-welded on its periphery, thereby ensuring electrical conduction so that current flows through the weld 4Bb. The positive electrode side also is substantially of the same construction.

The sealing materials 13A, 13B provide electrical insulation between the battery cover 3 and the external terminals 4A, 4B or the connecting sheets 5A, 5B. The sealing materials 13A, 13B also prevents the electrolyte within the secondary battery 30 from leaking via the through-holes 3A, 3B, and moisture and the like from entering the secondary battery 30 from the outside, thereby establishing internal airtightness of the secondary battery 30. The external terminal 4A of the positive electrode side is fabricated from an aluminum alloy, and the external terminal 4B of the negative electrode side is fabricated from a copper alloy. The sealing materials 13 are made from polyphenylene sulfide (PPS), an electrically insulating resin.

(Electricity-Generating Element Assembly)

As shown in FIG. 2, the electricity-generating element assembly 50 is formed by connecting the non-coated sections 6A, 6B of the electricity-generating element group 6 and the positive and negative electrode connecting sheets 5A, 5B of the cover assembly 12 together into an integrated unit under pressure by means of ultrasonic welding. This establishes mechanical and electrical connection of the external terminals 4A, 4B to the electricity-generating element group 6, and mechanical supporting of the electricity-generating element group 6 by the battery cover 3.

The non-coated sections 6A, 6B of all layers present in a direction perpendicular to the connection surfaces 53A, 53B are simultaneously connected together at two connecting portions, 8A1 and 8A2, on the positive electrode side and at two connecting portions, 8B1 and 8B2, on the negative electrode side. As described above, since no active material mixture is used in the non-coated sections 6A, 6B, the thickness of these sections is correspondingly small in comparison with that of the coated sections 6F, 6G. Additionally, since the connecting pressure applied during welding removes practically all clearances between the layers (bundles the current-collector foils together to come into contact with each other), the thickness of the entire non-coated sections 6A, 6B is small, compared with thickness of central and neighboring regions of the electricity-generating element group 6, the central and neighboring regions being where the coated sections 6F, 6G exist. The layers of the non-coated sections 6A, 6B which have thus been connected under pressure are bundled together centrally in a thickness direction of the electricity-generating element group 6 that is perpendicular to the connecting surfaces 53A, 53B.

Positions of the connecting portions 8A1, 8A2, 8B1, 8B2 are described below.

Figure 5:
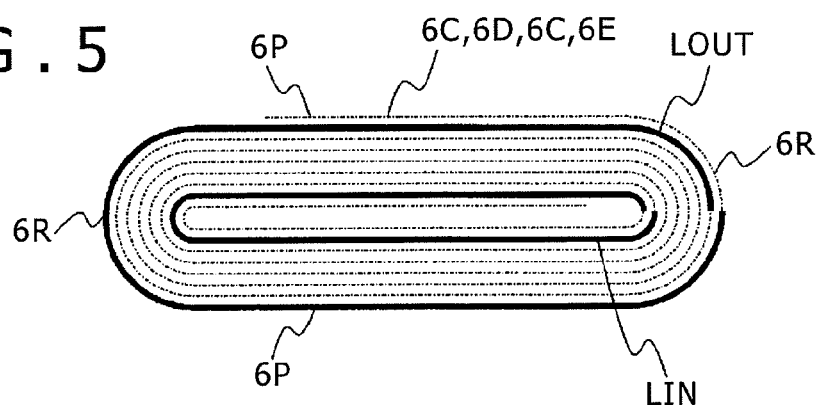
FIG. 5 is a cross-sectional view showing schematically the electricity-generating element group.

As shown in FIG. 5, the electricity-generating element group 6 is formed by winding one of the separators 6C, the negative electrode sheet 6D, the other separator 6C, and the positive electrode sheet 6E, into a four-layer flat spiral shape. Since the four layers each have certain thickness, outermost circumferential length LOUT of the wound positive and negative electrode sheets 6E, 6D in the electricity-generating element group 6 is greater than innermost circumferential length LIN of the wound positive and negative electrode sheets 6E, 6D in the electricity-generating element group 6. In the electricity-generating element group 6, the separators 6C are wound through several turns at a starting end portion and ending end portion of winding, but these portions are omitted in FIG. 5.

Figure 7A:
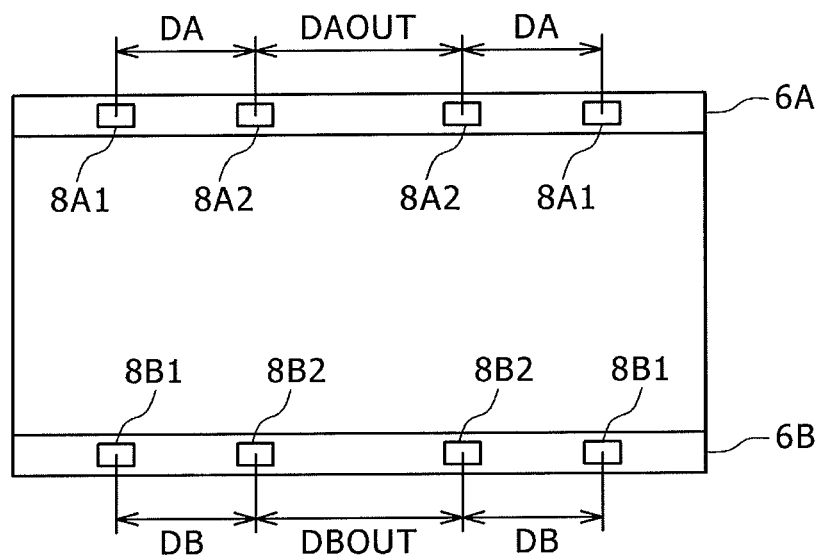
FIG. 7 is a plan view that shows connecting positions of the non-coated sections of the positive and negative electrode sheets in the electricity-generating element group, (A) showing one outermost circumferential winding turn of the positive and negative electrode sheets, and (B) showing one innermost circumferential winding turn of the positive and negative electrode sheets.
Figure 7B:
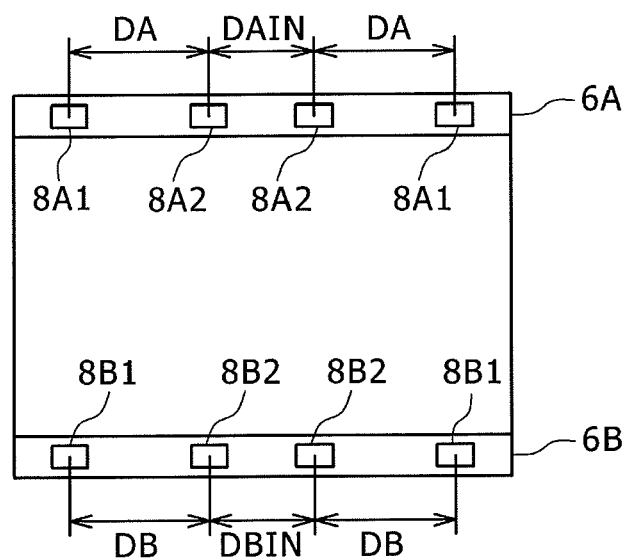

A plan view of the outermost circumferential winding turn of the electricity-generating element group 6 is shown in FIG. 7(A), and a plan view of the innermost circumferential winding turn in FIG. 7(B). As shown in FIGS. 7(A), 7(B), the connecting portions 8A1, 8A2 and 8B1, 8B2 are each present at two locations. Distances between fixed points from the connecting portions 8A1 to the connecting portion 8A2, and distances between fixed points from the connecting portions 8B1 to the connecting portions 8B2 are set to be greater than ¼ of the innermost circumferential length LIN of the electricity-generating element group 6 and also smaller than ¼ of the outermost circumferential length LOUT.

In addition, the distances DA between the adjacent connecting portions 8A1 and 8A2 are both the same and the distances DB between the adjacent connecting portions 8B1 and 8B2 are both the same. These are due to the fact that because of the simultaneous connecting of the non-coated sections 6A, 6B present in the direction perpendicular to the connecting surfaces 53A, 53B, a simultaneous connection occurred at two places during one winding turn. That is, after the winding of the electricity-generating element group 6, the connecting portions 8A1, for example, exist at the same location when seen in plan view, (the same also applies to the other connecting portions, namely 8A2, 8B1, 8B2). In the present embodiment, each distance DA is set to be the same as each distance DB. As shown in FIG. 7(A), distances DAOUT, DBOUT between the same outermost-circumferential adjacent connecting portions are greater than the distances DA, DB. Conversely as shown in FIG. 7(B), distances DAIN, DBIN between the same innermost-circumferential adjacent connecting portions are greater than the distances DA, DB.

(Assembly Procedure)

A procedure for assembling the lithium-ion secondary battery 30 of the present embodiment is next described below. The present invention is not limited to the following assembly procedure.

(Outline)

The assembly procedure includes the step of forming the cover assembly by fixing the sealing materials 13A, 13B, the connecting sheets 5A, 5B, and the external terminals 4A, 4B to the battery cover 3 and fabricating the battery cover assembly 12, the step of assembling the electricity-generating element group 6 by winding, and then shaping, the positive and negative electrode sheets 6E, 6D and the two separators 6C, the step of fabricating the electricity-generating element assembly 50 by electrically and mechanically connecting the electricity-generating element group 6 to the connecting sheets 5A, 5B of the battery cover assembly 12, and the sealing step of inserting the electricity-generating element assembly 50 into the battery casing 1, welding the battery casing 1 and the battery cover 3 together, and filling the battery with electrolyte.

(Cover Assembly Forming Step)

As shown in FIG. 2, the sealing material 13B is fitted into the two through-holes 3B of the battery cover 3 and the external terminals 4A, 4B are inserted into the sealing member 13B. The front ends of the inserted external terminals 4A, 4B located inside the battery are passed through through-holes provided beforehand in the connecting sheets 5A, 5B, and the front ends are caulked/staked to fix the terminals. After this, the external terminal 4A and the connecting sheet 5A, and the external terminal 4B and the connecting sheet 5B are welded onto each other at the caulked/staked portion 4Ba to ensure even more firm electrical and mechanical connection at the weld 4Bb. Thus the battery cover assembly 12 is fabricated. Since the external terminal 4A and the connecting sheet 5A, and the external terminal 4B and the connecting sheet 5B are in direct contact with and welded onto each other, electrical conduction is established between the two welded connections. Additionally, these connections and the battery cover 3 are electrically insulated from each other since they are in contact via the sealing material 13B having an electrical insulating property. Furthermore, each is mechanically integrated by actions of caulking/staking and welding.

(Electricity-Generating Element Group Assembly Step)

The electricity-generating element group 6 is formed by winding the positive electrode sheet 6E and the negative electrode sheet 6D via the separators 6C to shape the element group 6 into cross-sectionally elliptic form. That is, as shown in FIG. 3, one separator 6C, the negative electrode sheet 6D, the other separator 6C, and the positive electrode sheet 6E are laminated in that order and then these elements are wound from one side to obtain the cross-sectionally elliptic shape. At this time, the non-coated section 6A of the positive electrode sheet 6E and the non-coated section 6B of the negative electrode sheet 6D are arranged on sides opposite to each other. In addition, only the separators 6C are wound through several turns at the starting and ending sections of winding.

The positive current-collector foil of the positive electrode sheet 6E is formed from an aluminum foil. The positive electrode active material mixture containing a lithium transition metal double oxide such as lithium manganate is used, and the positive electrode active material mixture is applied to the entire positive current-collector foil to obtain a substantially uniform coating at substantially equal rates. In addition to a positive electrode active material, the positive electrode active material mixture contains an electroconductive material such as a carbon material, and a binder such as polyvinylidene fluoride (hereinafter, abbreviated to PVDF). Prior to the application of the positive electrode active material mixture to the positive current-collector foil, viscosity of this active material mixture is appropriately conditioned using a dispersion solvent such as N-methylpyrrolidone (hereinafter, abbreviated to NMP). The non-coated section 6A is formed during the conditioning of the viscosity. After the application of the positive electrode active material mixture, the positive electrode sheet 6E is dried and then roll-pressed for density conditioning.

The negative current-collector foil of the negative electrode sheet 6D is formed from a copper foil. The negative electrode active material mixture contains a carbon material, such as graphite, that can reversibly occlude/release lithium ions, and the negative electrode active material mixture is applied to the entire negative current-collector foil to obtain a substantially uniform coating at substantially equal rates. In addition to a negative electrode active material, the negative electrode active material mixture contains an electroconductive material such as acetylene black, and a binder such as PVDF. Prior to the application of the negative electrode active material mixture to the negative current-collector foil, viscosity of this active material mixture is appropriately conditioned using a dispersion solvent such as NMP. The non-coated section 6B is formed during the conditioning of the viscosity. After the application of the negative electrode active material mixture, the negative electrode sheet 6D is dried and then roll-pressed for density conditioning.

Length of the negative electrode sheet 6D is set to be greater than that of the positive electrode sheet 6E to prevent this electrode sheet from protruding from the negative electrode sheet 6D in the winding direction at the innermost and outermost circumferential edges of the winding turns when the positive electrode sheet 6E and the negative electrode sheet 6D are wound. In addition, in order to prevent the coated sections 6F, 6G of the positive electrode sheet 6E and negative electrode sheet 6D from coming into contact with each other, the separators 6C are set to be wider than the coated sections 6F, 6G of the positive electrode sheet 6E and negative electrode sheet 6D in the width direction that the coated sections 6F, 6G overlap.

(Electricity-Generating Element Assembly Forming Step)

Figure 6A:
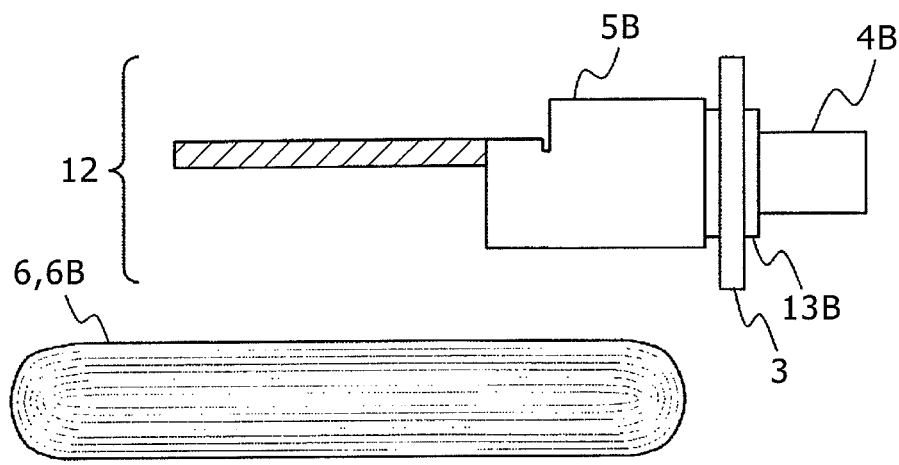
FIG. 6 is a cross-sectional view that shows assembly states of the lithium-ion secondary battery of the embodiment, (A) showing the state of the battery existing before ultrasonic welding, and (B) showing the state of the battery existing after ultrasonic welding.
Figure 6B:
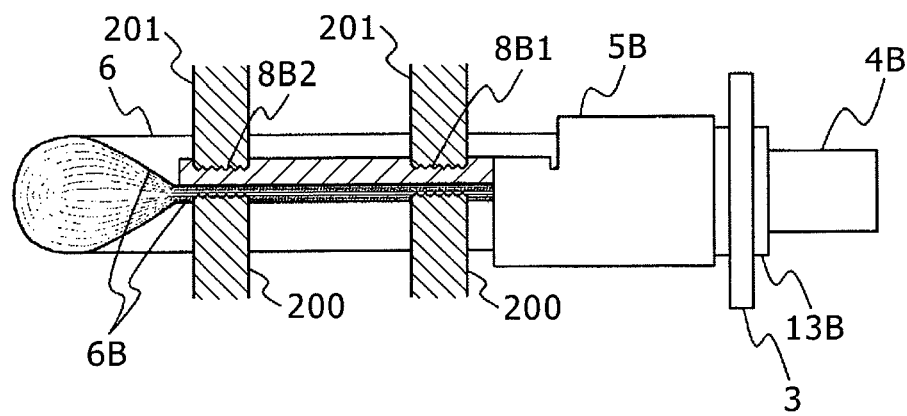

As shown in FIG. 6(A), the battery cover assembly 12B constructed in the cover assembly forming step, and the electricity-generating element group 6 constructed in the electricity-generating element group assembly step are provided and both are positioned using a jig not shown. Next as shown in FIG. 6(B), the current-collector foil constituting the non-coated section 6B is moved close to a central side in the thickness direction of the electricity-generating element group 6 and brought into firm contact. After this, the connecting sheet 5B is brought into contact with an uppermost surface of the non-coated section 6B and then pressurized in a direction of an arrow with chips 200 and anvils 201, as shown. Additionally, horizontal ultrasonic vibration is applied to the contact surface, connect all layers of the non-coated section 6B and the connecting sheet 5B together at the same time. In this manner, the electricity-generating element assembly 50 is fabricated. The electricity-generating element group 6 and the external terminal 4B are both electrically and mechanically connected via the connecting sheet 5B. After this, the chips 200 and the anvils 201 are retreated to complete the step.

The connection between the connecting portions 8B1 and 8B2 may take place at the same time as described above, or may take place in different timing for each location. The non-coated section 6A and the connecting sheet 5A are connected in substantially the same manner as the non-coated section 6A and the connecting sheet 5A are connected.

(Sealing Step)

As shown in FIG. 2, the electricity-generating element assembly 50 constructed in the electricity-generating element assembly forming step is inserted into the battery casing 1 and after edges of the battery cover 3 have been fitted to those of the opening 11 in the battery casing 1, a pressure is applied using a jig with care so as not to create a clearance between the mating surfaces of both. Next, a laser beam is emitted towards the mating surfaces of the edges of the battery cover 3 and the battery casing 1 and scanned all over along the mating surfaces to connect the battery casing 1 and the battery cover 3 each other.

After that, the battery is filled with electrolyte from the filling port 20. The electrolyte can be a non-aqueous electrolyte that contains a lithium salt, such as lithium hexafluorophosphate ($LiPF_6$), dissolved in an ester-carbonate-based organic solvent such as ethylene carbonate. For example, a measure for reducing an internal pressure of the battery casing 1 to a level relatively lower than an outer circumferential pressure of the battery may be adopted for equal as well as efficient impregnation of the electrolyte into an inner circumferential region of the electricity-generating element group 6. After filling, the filling port 20 is hermetically sealed with the filler plug 22 and then an outer circumference of the mating surface between the filling port 20 and the filler plug 22 is laser-welded for airtight sealing.

(Operation and Effect)

Next, the operation and effect of the secondary battery 30 according to the present embodiment are described below.

Figure 8:
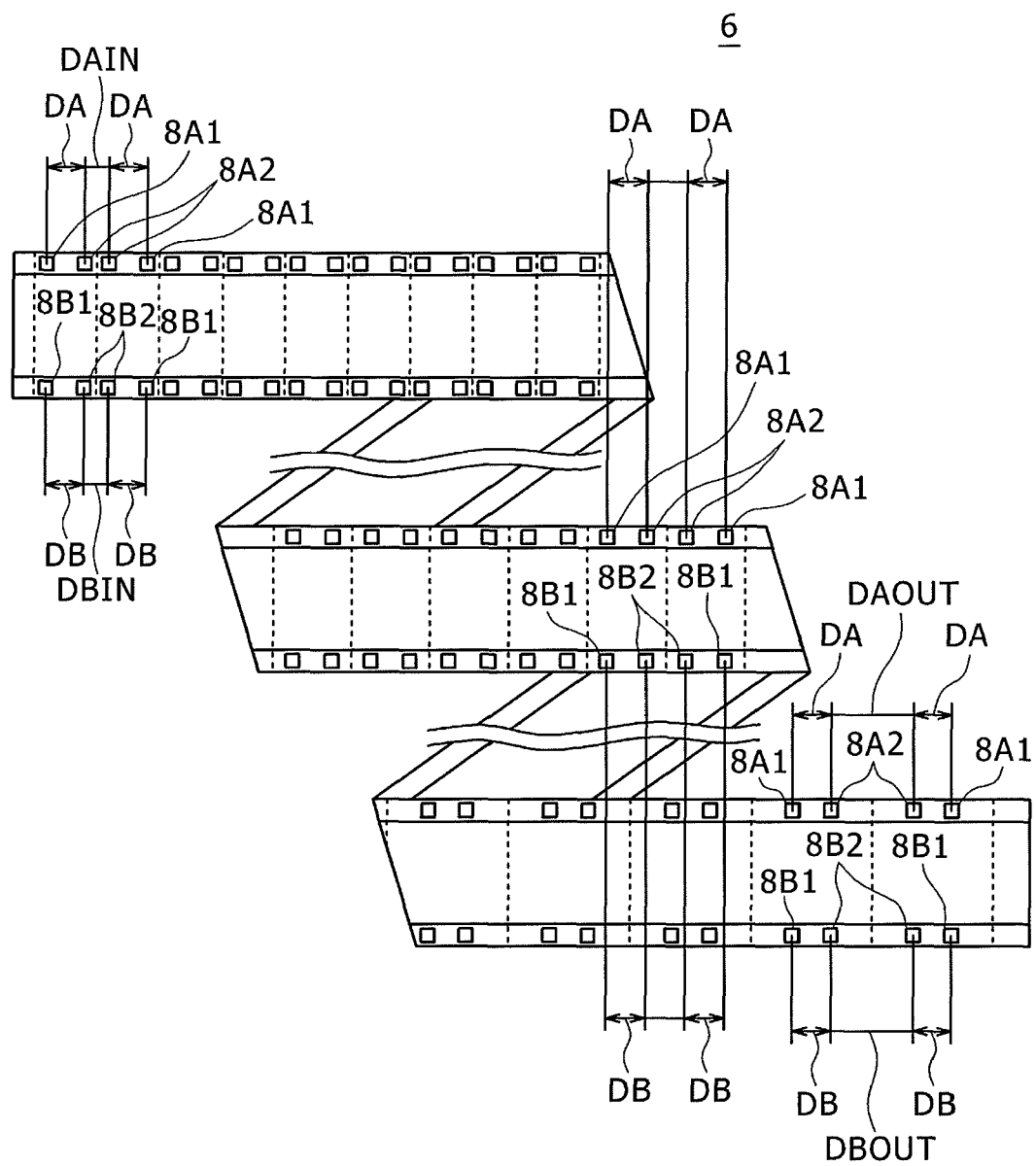
FIG. 8 is a development view of the electricity-generating element group.

As shown in FIG. 8, in a developed state of the wound electricity-generating element group 6, the distances DA between the adjacent connecting portions 8A1 and 8A2 are both the same and the distances DB between the adjacent connecting portions 8B1 and 8B2 both take the same value over the entire region of the electricity-generating element group 6 (i.e., the region ranging from the innermost circumference to the outermost circumference). By contrast, however, the distances DAOUT between the same outer-most circumferential adjacent connecting portions are greater than the distances DAIN between the same innermost-circumferential adjacent connecting portions, and the distances DBOUT are greater than the distances DBIN. In addition, nearly between the innermost circumference and the outermost circumference inclusive, distances between same adjacent connecting portions take values lying between the distances DAIN and the distances DAOUT, and between the distances DBIN and the distances DBOUT, while at the same time, the values continuously increase little by little. The distances DA and the distances between the same adjacent connecting portions, therefore, become equal somewhere at a section between the innermost circumference and outermost circumference of the electricity-generating element group 6.

That is, the secondary battery of the present embodiment can develop an ideal state in which the distances between the plurality of adjacent connecting portions 8A1, 8A2 or 8B1, 8B2 are substantially equal, at a section between the innermost circumference and outermost circumference of the wound electricity-generating element group 6. Meanwhile, the battery 30 is also endowed with characteristics that as focus is moved from that section and brought closer to the innermost circumference and moved from the particular section and brought closer to the outermost circumference, the battery becomes more distanced, although little by little, from the ideal state (i.e., the distances depart more from the substantially equal state).

This consequently allows the current density near the connecting portions to be nearly equalized at many sections between the innermost circumference and the outermost circumference, and thus a heat distribution to be minimized. The deterioration of the active material attributable to temperature can also be minimized. Additionally, since the current density is uniformized, consequential leveling of the battery reactions in the entire electricity-generating element group even enables prevention of minor short-circuiting due to deposition of lithium dendrite that a local current causes.

Since ultrasonic connection, not laser welding, is used to connect the connecting portions, the separators suffer no thermal damage. In addition, because of no need to adopt an unrealistic method of connecting each entire non-coated section, ultrasonic connection excels in productivity and allows mass productivity to be obtained.

Furthermore, the connecting method according to the present embodiment is also most stable from a mechanical perspective of the structure in which the electricity-generating element group 6 is suspended by the two connecting sheets of the positive and negative electrodes, 5A and 5B. More specifically, when viewed from a direction of the planar region 6P of the electricity-generating element group 6, the upper/lower and left/right connecting portions all exist at symmetrical positions, so that even if vibration or the like of a vehicle on which the secondary battery 30 is mounted acts upon the battery 30, the relationship in position between the elements of the electricity-generating element group 6 and the connecting sheets 5A, 5B always remains fixed. This, in turn, helps prevent local stresses from arising from changes in the relative positions between the electricity-generating elements and the connecting sheets 5A, 5B, and thus ensures mechanical fatigue strength of the connecting portions 8A1, 8A2, 8B1, 8B2.

While an embodiment that enables the present invention to be applied has been described above, the invention can likewise be embodied in the following forms of modification.

(1) Although the lithium-ion secondary battery 30 has been described by way of example in the above embodiment, the present invention is not limited to the lithium-ion secondary battery 30 and can also be applied to practically all kinds of secondary batteries.

(2) Although lithium manganate and graphite have been shown as the positive electrode active material and the negative electrode active material, respectively, in the above embodiment, the present invention is not limited to those materials and any active material as usually used in a lithium-ion secondary battery can be used as an alternative. Any positive electrode active material can be used, only if it is a material that allows lithium ions to be inserted thereinto and desorbed therefrom and exploits a lithium transition metal double oxide containing a sufficient quantity of lithium ions inserted in advance. For example, the positive electrode active material can be a material in which either the lithium in a crystal of a lithium transition metal double oxide or part of the transition metal has been replaced by or doped with any other element.

(3) In addition, there are no limitations on a crystal structure of a lithium transition metal double oxide, and the lithium transition metal double oxide may have a crystal structure of either a spinel system, a laminar system, or an olivine system. Among negative electrode active materials other than graphite, on the other hand, can be carbon materials such as cokes or amorphous carbon, and particle shapes thereof can be, but not limited to, flaky, spherical, fibrous, or massive shapes, or the like.

(4) Electroconductive material and binder, mentioned by way of example in the above embodiment, are not limited, either. Any material as usually used in a lithium-ion secondary battery can be used as a replacement. The kinds of binders useable except in the embodiment include: polymers of polytetrafluoroethylene, polyethylene, polystyrene, polybutadiene, butyl rubber, nitrile rubber, styrene/butadiene rubber, polysulfide rubber, nitrocellulose, cyanoethyl cellulose, various kinds of latex, acrylonitrile, vinyl fluoride, vinylidene fluoride, propylene fluoride, or chloroprene fluoride; mixtures of these chemicals; and so on.

(5) Although a non-aqueous electrolyte with $LiPF_6$ dissolved in an ethylene-carbonate-based organic solvent such as ethylene carbonate has been described and shown by way of example in the above embodiment, a non-aqueous electrolyte using a general lithium salt as an electrolyte and formed by dissolving this lithium salt in an organic solvent may be used and the present invention is not limited to/by the lithium salt and organic solvent used. For example, the electrolyte can be $LiClO_4$, $LiAsF_6$, $LiBF_4$, $LiB(C_6H_5)4$, $CH_3SO_3Li$, $CF_3SO_3Li$, or the like, or a mixture of these materials. The organic solvent can be diethyl carbonate, propylene carbonate, 1,2-etoxyethane, γ-butyrolactone, sulfolane, propionitrile, or the like, or a mixed solvent formed by mixing at least two of these kinds of materials.

(6) The battery casing 1 or the battery cover 3 is not always fabricated from the aluminum alloy mentioned as an example in the above embodiment. Instead, the battery casing or the battery cover may be fabricated from, for example, nickel-plated steel or a stainless steel alloy.

(7) The sealing material 13 is not always fabricated from the polyphenylene sulfide (PPS) mentioned as an example in the above embodiment. Instead, the sealing material may be fabricated from an electrically insulating resin such as polybutylene terephthalate (PBT), perfluoroalkoxyfluorine (PFA).

(8) The sealing material 13 is not always formed as a part of an independent body. Instead, the sealing material may be formed by insert molding. For example, the sealing material 13 may be formed by insert-molding PPS, PBT, or any other appropriate resin material in an empty space while the battery casing 1 and the external terminals 4A, 4B are being retained at fixed spatial intervals. With insert molding, relative positions between the battery casing 1 and the external terminals 4A, 4B are fixed, electrical insulation between both is ensured, and airtightness is established between both. Such a configuration as this, allows the external terminal 4A and the connecting sheet 5A (and the external terminal 4B and the connecting sheet 5B) to be formed as a single member, and the number of parts required and that of assembly process to be reduced. On the other hand, although the connecting sheets 5A, 5B have been described and shown as a single part by way of example in the above embodiment, the connecting sheets may be constructed by electrically as well as mechanically connecting a plurality of parts.

(9) The present invention is therefore not limited to the above-described embodiment and can be applied to the lithium-ion secondary batteries or other secondary batteries that each have any one of various configurations with positive and negative electrode connecting sheets connected at two places to a non-coated section.

Industrial Applicability

Since the present invention provides a secondary battery adapted to minimize deterioration attributable to temperature, the invention has industrial applicability in that it contributes to manufacturing and selling the secondary battery.

The invention claimed is:

1. A secondary battery comprising:
   a cross-sectionally elliptic electricity-generating element group in which a positive electrode sheet including at one side in a longitudinal direction thereof a section not coated with an active material mixture, and a negative electrode sheet including at one side in a longitudinal direction thereof a section non-coated with an active material mixture are wound via separators in such a form that the non-coated sections of the positive and negative electrode sheets are arranged on sides opposite to each other;

a battery container to accommodate the electricity-generating element;

a positive electrode connecting sheet and a negative electrode connecting sheet, both connected at one side of each thereof to the non-coated sections of the positive and negative electrode sheets, respectively, that are positioned at end portions of a planar region present between curves formed by winding the positive and negative electrode sheets of the electricity-generating element group; and a positive electrode external terminal and a negative electrode external terminal, both fixed to the battery container and each connected to the other side of each of the positive and negative electrode connecting sheets;

wherein:

when the planar region of the electricity-generating element group is seen in plan view, the number of connections, between the non-coated section of the positive or negative electrode sheet and one side of the positive or negative electrode connecting sheet, is two for each of positive and negative electrodes; and a distance between the two connections is greater than ¼ of an innermost circumferential length of the wound positive and negative electrode sheets of the electricity-generating element group, but is smaller than ¼ of an outermost circumferential length of the wound positive and negative electrode sheets of the electricity-generating element group.

2. The secondary battery according to claim 1, wherein current-collector foils that constitute the non-coated sections of the positive and negative electrode sheets are bundled together at the end portions of the planar region of the electricity-generating element group so as to come into contact.

3. The secondary battery according to claim 1, wherein the distance between the two connections is the same as between the non-coated sections of the positive and negative electrode sheets.

4. The secondary battery according to claim 1, wherein the non-coated sections of the positive and negative electrode sheets and one side of each of the positive and negative electrode connecting sheets are interconnected by ultrasonic welding.

5. The secondary battery according to claim 1, wherein the positive electrode connecting sheet and the positive electrode external terminal are constructed as a single member, and the negative electrode connecting sheet and the negative electrode external terminal also being constructed as a single member.

* * * * *